Sept. 1, 1942. W. F. MOONEY 2,294,476
APPARATUS FOR CERAMIC CASTING
Filed March 22, 1941  3 Sheets-Sheet 1
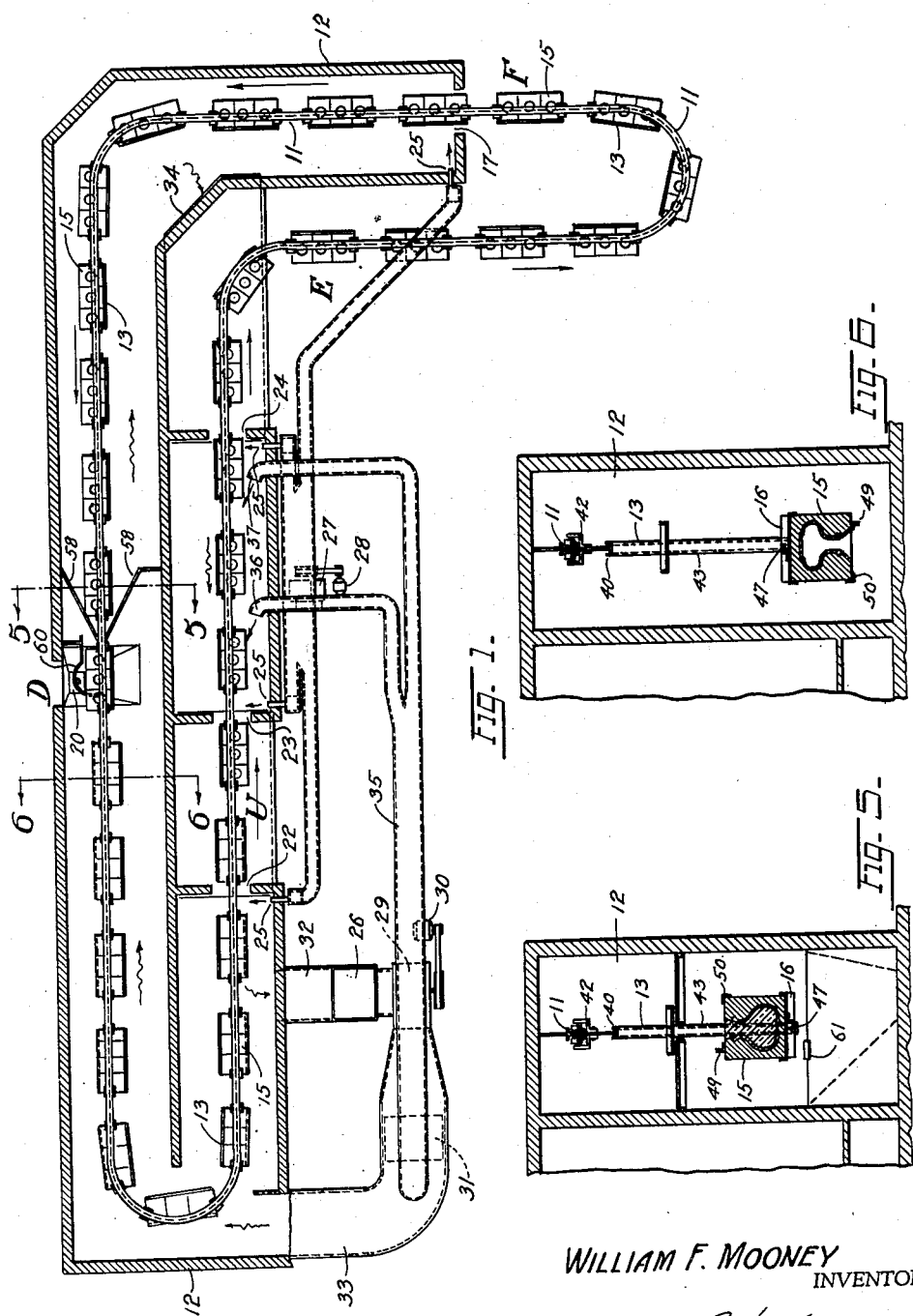
WILLIAM F. MOONEY
INVENTOR.
BY
ATTORNEY.

Sept. 1, 1942.  W. F. MOONEY  2,294,476
APPARATUS FOR CERAMIC CASTING
Filed March 22, 1941  3 Sheets-Sheet 2
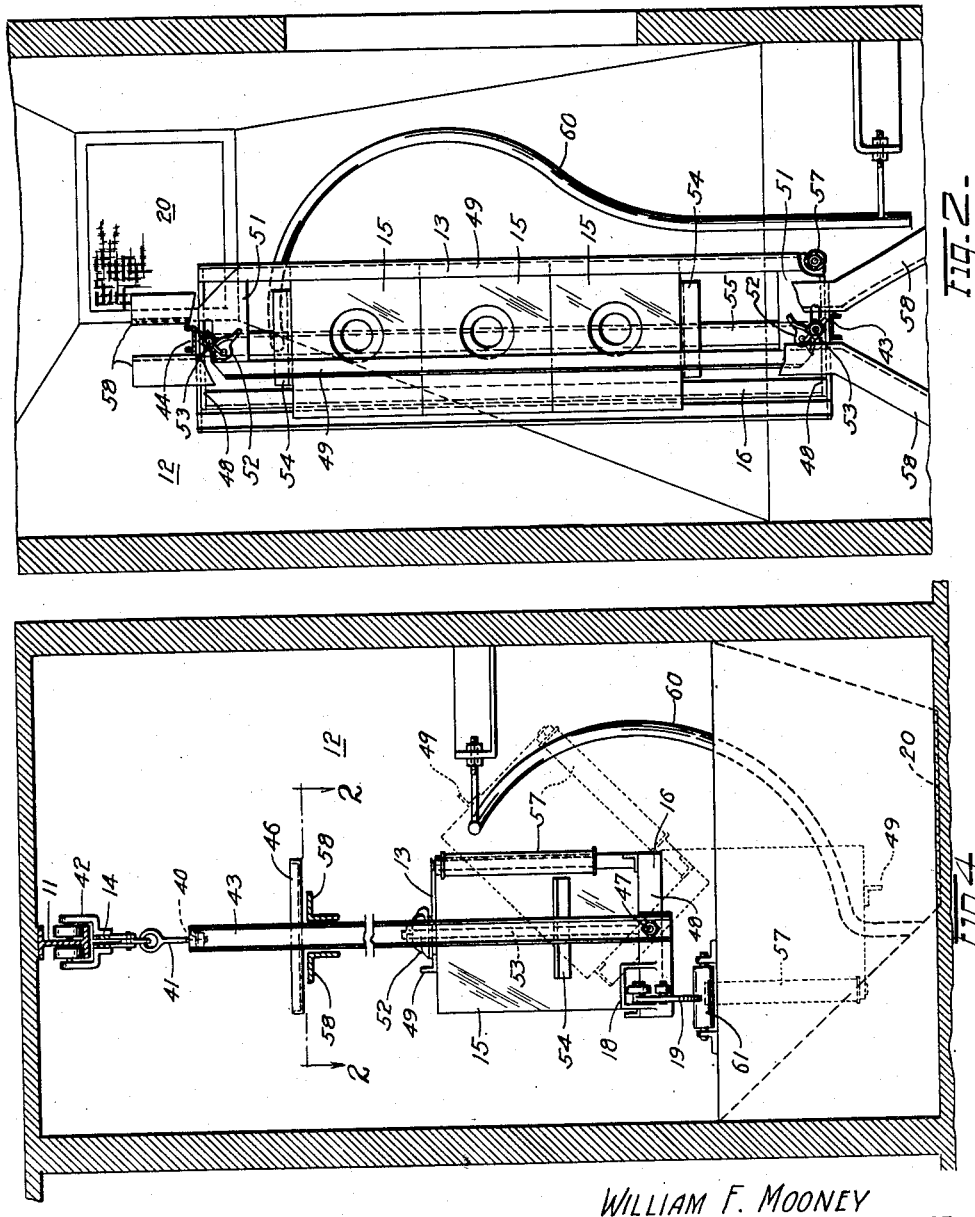
WILLIAM F. MOONEY
INVENTOR.
BY *Miner L. Hartmann*
ATTORNEY.

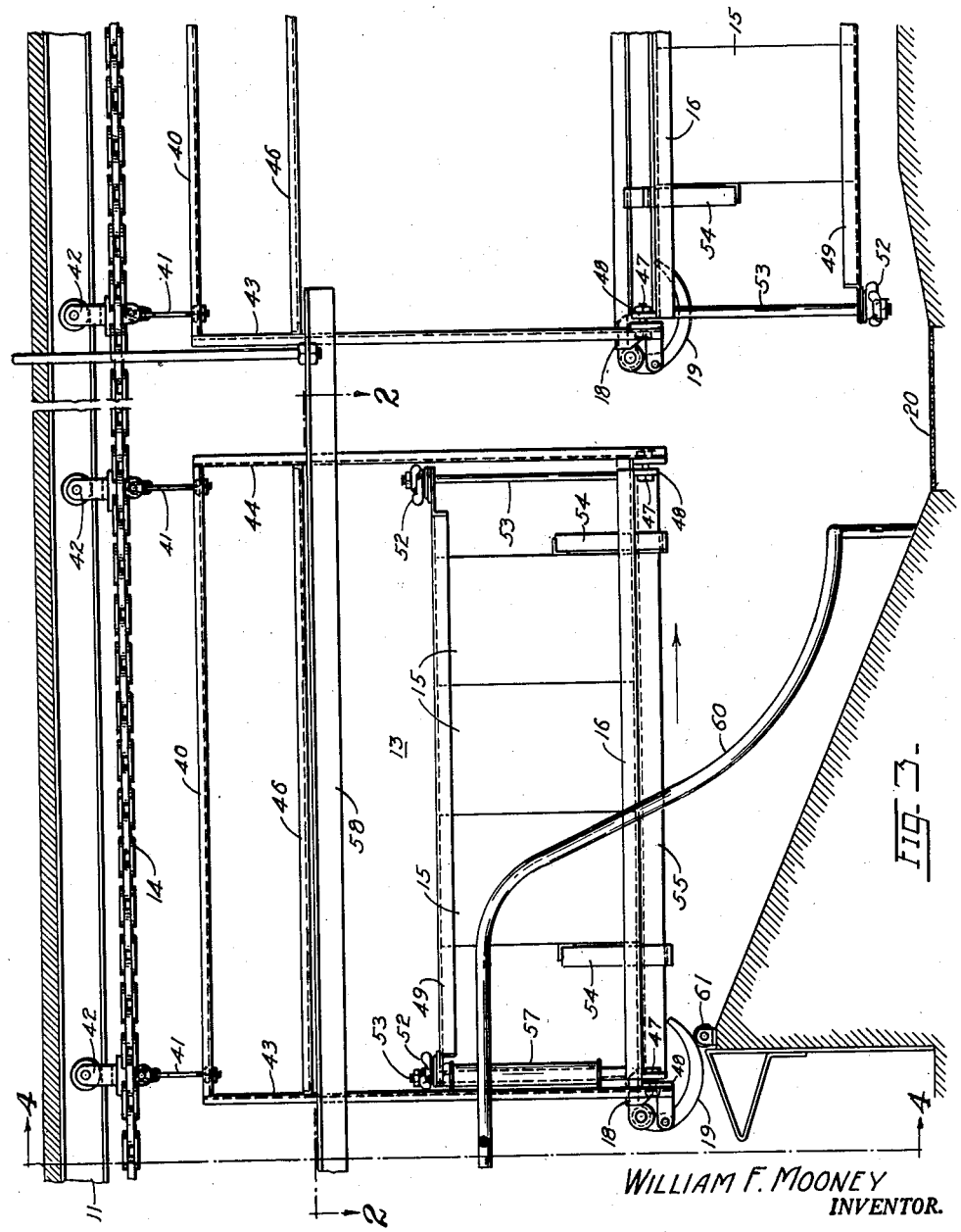

Patented Sept. 1, 1942

2,294,476

UNITED STATES PATENT OFFICE 2,294,476

APPARATUS FOR CERAMIC CASTING

William F. Mooney, Los Angeles, Calif., assignor to Pacific Clay Products Company, Los Angeles, Calif., a corporation of California Application March 22, 1941, Serial No. 384,661

8 Claims. (Cl. 25—29)

This invention relates to making cast ceramic ware, and in particular to the apparatus and a process for forming and drying cast ceramic shapes.

In the ceramic industry many hollow and intricate articles are shaped by the process of casting. In this process, a cavity of the desired shape is produced in a separable mold made of absorbent material, commonly plaster of Paris. A liquid suspension of clay and other ingredients, is put into the cavity, and the water, or a portion of it, is absorbed into the pores of the mold, thus leaving a layer of solidified ceramic mixture on the walls of the cavity. When the layer is of the desired thickness, the excess liquid suspension is poured out of the cavity, and, after further removal of water from the deposited layer into the plaster of Paris mold, or by evaporation, the shaped article is removed for final trimming, drying and firing. The plaster molds may be used repeatedly, but need to be at least partly dried out before they can be successfully re-used. The thickness and quality of the deposited ceramic material on the mold cavity walls depends upon many factors, among which are the important ones of the dryness of the mold at the time of filling, the time that the liquid suspension is held in the mold, the speed and completeness of removal of the excess liquid from the mold, and the degree of subsequent drying of the molded pieces. In the usual skilled hand-labor method, the time of absorption, the rapidity and completeness of emptying, and the suitability of the molds for reusing are almost wholly subject to assorted judgements of individual workmen. Under these conditions, the product of a single workman cannot be uniform, and when there are several workmen, the product may vary widely, even when all other factors in the operation are under strictest control.

One object of my invention is, therefore, to provide apparatus for producing cast ceramic shapes of uniform thickness and quality. Another object is to provide continuous apparatus in which absorbent molds of a uniform state of dryness are presented for refilling. Another object is to provide means for holding the liquid suspension in the uniformly dried molds for a fixed period of time. Still another object is to provide means for pouring out the excess liquid suspension in a uniform manner and time. Another object is to provide a conveyor car having means for holding the molds before, during and after emptying. Another object is to provide a process for making uniform ceramic castings. Still another object is to provide a process for making cast ceramic articles in which the porous molds after the article is removed are in a uniform dry condition for immediate reuse.

These and other objects are accomplished by my invention, as will be apparent from the more detailed description which follows, and the accompanying drawings, in which—

Fig. 1 is a plan view showing an arrangement for the continuous production of cast ceramic shapes;

Fig. 2 is an enlarged plan view of the lower part of a mold carrying car showing a tilting means;

Fig. 3 is a side elevation showing mold-carrying cars and means for tilting the mold rack and molds;

Fig. 4 is a cross-sectional view taken on the line 4—4 of Fig. 3;

Fig. 5 is a cross-sectional view taken on the line 5—5 of Fig. 1;

Fig. 6 is a cross-sectional view taken on the line 6—6 of Fig. 1.

Referring to the drawings, an overhead conveyor track 11 is arranged in a closed circuit passing for about three-quarters of its length through a tunnel drier 12. Upon the track 11, mold-carrying cars 13 are suspended, and conveyed by a drive chain 14 around the circuit. The tunnel 12 is constructed of suitable material such as sheet-iron or wood, preferably heat-insulated, and is provided with means for introducing drying air. In outline, the system is as follows: The cars 13 carrying one or more dried molds 15, are moved past the filling station F, where the mold cavities are filled with a clay suspension or slip. The loaded cars then pass through an air curtain 17 into the first portion of the tunnel, where sufficient time is provided for the absorbent mold walls to take up part of the water and leave a layer of partly de-watered mixture on the walls of the cavity. By the time the cars have reached the tilting station D, the layer of ceramic mixture on the walls of the mold cavity is of the desired thickness. At the tilting station D the latch 18 holding the pivoted rack 16 in upright position on the car 13 is released by a trigger 19, and the unbalanced weighting causes the rack and its molds to be turned up-side-down, the structure of the cars and racks, and the means for controlling the tilting being described in detail below. The excess slip is thus poured out of the mold cavities, and collects in the drain 20, and is recovered.

The inverted molds 13 and the contained wet plastic lining in the cavity are then subjected to heated drying air passed through the tunnel. As the cars emerge from the main drier through the air curtain 22, the racks with the partly dried molds and shaped pieces are set upright at the station U, and the "spare edges" are removed from the cast pieces; the cars then enter through the air curtain 23 into and through the final drier section. Upon emergence through the air curtain 24, the mold sections are opened for removal of the cast pieces, at station E, following which the molds are re-assembled on the racks of the cars, fastened down by the wedge-locks 52, and moved to the filling station F, where they are re-filled and the cycle repeated through the drier.

The air curtains 17, 22, 23 and 24 at the entrances and exits of the tunnel prevent the escape of drying air from the drier. Nozzles 25 are arranged to discharge blasts of air across the openings for the cars, the compressed air being supplied by the auxiliary blower 27 actuated by a motor 28.

The drying air for the tunnel is supplied by the main blower 29 driven by the motor 30, which picks up air from the return duct 32, blows it through the heater 31 into the main conduit 33, through the tunnel over the up-side-down molds on the conveyor cars, past the tilting station D to the return intake 34 located a short distance inside the main car entrance, into a duct (not shown) located beneath the cars, leading back to the main blower intake 32. A portion of the hottest air from the main blower 29, after passing through the heater 31, is diverted into the final drier section through conduits 35, with outlets 36 and 37, for the final drying of the molded ware and the plaster-of-Paris molds. A portion of fresh air may be introduced at intake 26. The direction of movement of the heated air is countercurrent to the car movement.

Each conveyor car 13 consists of a horizontal top bar member 40 to which eyebolts 41 are attached, near the ends thereof, the "eyes" being linked to the trolleys 42 which travel on the conveyor track 11. The cars are operatively connected to the chain 14, which serves to move them around the circuit. Depending end members 43 and 44 are fastened to the horizontal bar 40, and a rack 16 for holding the molds 15 is also attached to the depending end members 43 and 44 by pivot means 47, the pivot being so located that the rack and molds will tip over (outwardly) unless held in place by a latch means, 18. The mold holding rack 16 has a top frame consisting of longitudinal angle members 49 and 50, with connecting members 51 at the ends, the angle member 50 being positioned with an overturned edge to hold the outside corner of the molds. The top frame and the bottom frame are adapted to engage the molds therebetween, wedge clamps 52 being provided between the connecting members 51 and vertical rods 53 attached to bottom members near the ends of the cars and extending upwardly through the top frame. The molds 15 are held securely against movement endwise of the cars by clamping means 54, which are detachably fastened to a central longitudinal member 55 of the bottom of rack 16.

Each rack 16 is provided, at its rear outside corner with a vertically disposed roller 57. In operation, when a car approaches the tilting station marked D on Fig. 1, the upright members 43 and 44 pass between a pair of rails 58, which prevent lateral movement of the suspended car caused by the roller 57 pressing against a downspiralled guide bar 60, which is rigidly attached to the side-wall and bottom of the drier tunnel. At about this same time, the trigger 19 on the car engages the trip 61, which in turn releases the latch 18 holding the rack 16 and its molds 15 in upright position. The rack and contents being unbalanced, with the load overturning the rack toward the outside of the circuit, the roller 57 presses against the guide bar 60 as the car progresses, until at the bottom of the spiral the rack 16 and the molds held therein are up-side-down. The liquid emptied from the molds is collected in the drain 20. The cars with inverted racks and molds are conveyed through the main drying zone, during which time the water in the molded pieces, as well as in the porous mold, is to a large extent, evaporated.

At station U, outside the main drying tunnel, the racks and molds are turned upright; also the "spare edges" are removed by hand from the molded pieces, this operation being advantageously done before the molded pieces are too dry. The cars with uprighted molds progress through the final drying tunnel section, following which the molds are disassembled to remove the molded pieces, then re-assembled, refilled with slip, and again carried through the cycle.

The many advantages of my invention will be apparent to those skilled in this art. The porous molds, after travelling through the drier in the manner indicated, are presented for refilling in a uniformly dry condition, and therefore have uniform capacity and rate for absorption of water from the clay slip at each refilling. This insures that the thickness of the cast pieces will be within the allowable tolerances. The dumping out of the excess slip at a pre-determined time after filling also tends to produce uniform thickness in the castings, and the provision of means for gradually and uniformly tilting the molds to remove the excess slip, without jolts or jars, insures that the tender freshly formed articles in the molds will not be injured, and that losses due to defective castings will be minimized. The number of molds required for a given number of castings per day is greatly reduced over the old hand method of casting, because each mold on the conveyor may be used repeatedly since it is dried and ready for re-use as soon as the cast piece is removed. The rate of progress of the cars through the cycle may be changed as desired for different products; and with a uniform rate of progression, different wall thicknesses of castings may be made by varying the porous mold composition or design, and/or changing the composition of the slip. The breakage of the molds is greatly decreased over the older method of manual operation.

While a specific embodiment of my invention has been shown and described, I do not wish to be restricted to these details, but limit the scope of my invention only insofar as required by the prior art and the spirit of the appended claims.

I claim:

1. In an apparatus for making ceramic castings, the combination of a continuously moving conveyor for carrying absorbent molds, means for filling the molds with ceramic slip as they are conveyed past a filling position, means for removing excess slip after it has remained in the molds for a fixed period of time, and means for circulating drying air over and around the molds and their contained castings to effect simultaneous drying of molds and castings, said means for removing the excess slip comprising a tiltable rack for holding one or more molds to said conveyor, means for laterally tilting the rack when it reaches a selected position, guide means supporting said rack adapted to control the rate of tilting of the rack with its one or more molds as the conveyor advances, and means for supporting the rack with its one or more molds in overturned position while the molds and contents are drying.

2. In an apparatus for making ceramic castings the combination of a continuously moving conveyor for carrying absorbent molds, means for filling the molds with ceramic slip as they are conveyed past a filling station, means for removing excess slip after it has remained in the molds for a fixed period of time, and means for simultaneously drying the molds and their contained castings, said means for removing the excess slip comprising an unbalanced laterally tiltable rack for holding one or more molds operatively attached to said conveyor, a rack latch releasable by a trip as the rack reaches a selected position, a downwardly curved guide rail adapted by its curvature to control the rate of tilting of the rack with its one or more molds as the conveyor advances, and means for supporting the rack with its one or more molds in overturned position while draining and drying the molds and contents.

3. An apparatus for making ceramic castings comprising an overhead continuously moving conveyor, car frames suspended from said conveyor, a pivoted rack with one or more molds attached thereto, a rack-latch releasable by a trip as the rack reaches a selected position, means for laterally tilting the racks and molds to an inverted position, and a downwardly inclined guide rail adapted to support the tilted rack as the car frames move forward on the conveyor to control the rate of tilting of the rack and its one or more molds and contents.

4. In an apparatus for making ceramic bodies, an overhead continuously moving conveyor with cars for carrying absorbent molds in closed circuit permitting the operations of filling with slip, absorbing water, removing excess slip and drying, said cars comprising depending members attached to the conveyor trolleys, a pivoted rack supported by the members adapted to hold one or more molds thereon, a rack-latch adapted to keep the rack and molds in upright position until released by a trip as the rack reaches a selected position in the circuit of the conveyor, and a downwardly inclined guide rail adapted to support the rack as it is overturned, as the conveyor advances.

5. In an apparatus for making ceramic castings, an overhead continuously moving conveyor with cars carrying absorbent molds in a closed circuit permitting the operations of filling with slip, absorbing water, removing excess slip and drying, said cars comprising depending end members attached to the conveyor trolleys, a rotatable rack supported by the end members adapted to hold one or more molds thereon, a rack latch adapted to keep the rack and molds in upright position until released by a trip when the rack reaches a selected position in the circuit of said conveyor, a roller on said rack adapted to cooperate with a guide rail, and a downwardly curved guide rail mounted adjacent the selected position to control the rate of tilting of the rack as the conveyor advances.

6. In an apparatus for making ceramic castings, the combination of an overhead continuously moving conveyor; conveyor cars for carrying absorbent molds in a closed circuit; means for filling the molds with ceramic slip as they are conveyed past a filling position; means for removing excess slip after it has remained in the molds for a fixed period of time; said slip-removing means comprising a pivoted rack on the cars to which is removably fastened one or more molds, a rack-latch adapted to hold the rack in upright position, a trip adapted to release said latch at a selected position in the circuit, a downwardly inclined guide rail coacting with the rack adapted to control the rate and manner of tilting as the conveyor advances, and means for supporting the rack with its one or more molds in overturned position while draining and drying; and a drying tunnel through which the conveyor carries the overturned racks and molds to effect the simultaneous removal of moisture from the molds and their contained castings.

7. In an apparatus for making ceramic castings, the combination of a continuously moving conveyor for carrying absorbent molds; means for filling the molds with ceramic slip as they are conveyed past a filling position; means for inverting the molds in a uniform manner and at a selected rate of inversion after the slip has remained in the molds for a fixed period of time; and means for simultaneously drying the molds and their contained castings comprising a chamber through which the molds and castings are moved by said conveyor, and means for blowing drying air through said chamber over and around each mold and contained casting in a direction counter-current to the movement of the conveyor in said chamber.

8. In an apparatus for making ceramic castings, the combination of an overhead continuously moving conveyor for carrying absorbent molds, and means for removing excess slip from the molds comprising an unbalanced tiltable rack for holding one or more molds operatively attached to said conveyor, a rack-latch releasable by a trip as the rack reaches a selected position, a downwardly inclined guide-rail adapted to support the tilting rack and to control the rate and manner of tilting of the rack and its one or more molds as the conveyor advances, and means for supporting the rack with its one or more molds in inverted position while simultaneously draining and drying both the molds and their contained castings.

WILLIAM F. MOONEY.